March 26, 1940.  C. T. LENZKE  2,194,948
MEAT MOLDING DEVICE
Filed June 20, 1938
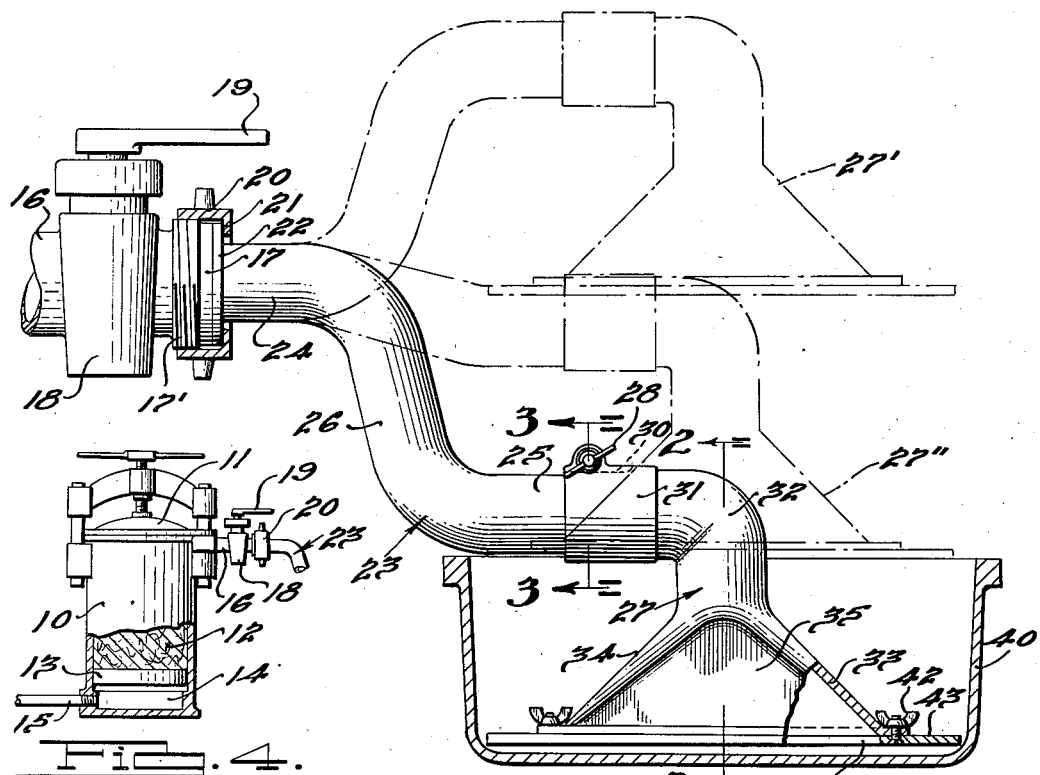
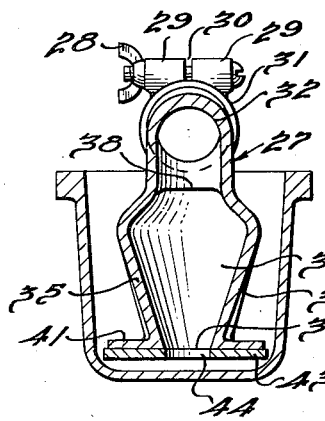
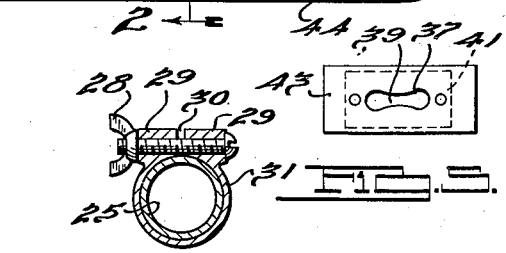
INVENTOR
Conrad T. Lenzke.
BY
ATTORNEY Patented Mar. 26, 1940

2,194,948

UNITED STATES PATENT OFFICE 2,194,948

MEAT MOLDING DEVICE

Conrad T. Lenzke, Detroit, Mich.

Application June 20, 1938, Serial No. 214,732

14 Claims. (Cl. 226—93)

My invention relates to molding devices and refers more particularly to improvements in devices for molding meat into loaves and other desired shapes.

Prior to my invention it has been customary to form loaves of ground meat by hand-tamping the meat into a mold but such practices are slow and laborious and consequently expensive from the standpoint of commercial production of meat loaves. Furthermore, prior methods give rise to the formation of voids or air holes in the meat loaf and when the loaf is sliced the meat has an uneven and streaky appearance. Still further, such methods result in considerable wastage and are unsanitary in that rather large quantities of the meat come in contact with the hands of the operator.

It is an object of my invention to provide means which will overcome the aforesaid difficulties and objections.

Another object of my invention is to provide a meat holding device of simple construction, easily cleaned and capable of operation in rapidly and efficiently forming meat loaves in large quantities, the resulting loaves being uniform in shape and texture, free from voids, humps or bulges and streaks in the meat, both before and after baking and cooking.

A further object of my invention is to provide means for molding the meat under pressure, preferably by employing a mold and a meat pressure dispenser adapted to be relatively moved by hand during the molding or mold filling operation.

Another object of my invention is to provide a meat dispensing device capable of use with a variety of molds of different shapes and capacities.

Further objects and advantages of my invention reside in the novel combination and arrangement of parts more particularly hereinafter described and claimed, reference being had to the accompanying drawing in which:

Fig. 1 is a side elevational view of my meat molding device, the mold and a portion of the meat dispenser being illustrated in cross-section.

Fig. 2 is a sectional elevational view taken as indicated by line 2—2 of Fig. 1.

Fig. 3 is a detail sectional view taken as indicated by line 3—3 of Fig. 1.

Fig. 4 is an elevational view of an air stuffer with a part of the casing broken away.

Fig. 5 is a bottom plan view at a reduced scale of the meat dispenser of Figs. 1 and 2.

In carrying out my invention I preferably grind the meat in raw form, and form an emulsion of the meat which is generally customary in preparing the meat for sale or use in loaf form. Any kind of meat may be employed, such as beef, pork, veal, etc., and the meat emulsion is formed by the addition of seasoning substances, water, and other ingredients well known in the art.

The meat emulsion is preferably placed in a suitable storage container for delivery under pressure to the molds. Referring to the drawing I have illustrated in Fig. 4 a conventional type of a storage container known as an air stuffer at 10. This stuffer has a top 11 removable to receive the meat emulsion 12 above the piston 13. Below the piston the stuffer 10 has a chamber 14 supplied with compressed air at 15. The stuffer has a delivery pipe 16 terminating in an end portion 17 threaded at 17', a valve or cock 18 operated by a handle 19 being interposed in the pipe 16 to regulate the delivery of the meat at end 17. The air pressure in chamber 14 forces piston 13 upwardly causing delivery of the meat emulsion at the pipe end 17 under control of the cock 18.

Threadedly engaging the end 17 I have provided a coupling member 20 having an inwardly extending annular flange 21 for clamping the external flange 22 of a delivery pipe 23 against the end face of pipe portion 17. The delivery pipe 23 is preferably in the form of a goose-neck or crane as it has the longitudinally and transversely off-set receiving and delivery end portions 24 and 25 respectively and the connecting reversely curved portion 26.

The pipe portion 25 is adapted to carry the nozzle-like head 27 of my dispensing device, preferably by a clamp fastener 28 which engages end portions 29 formed by a slot 30 in the tubular or receiving inlet portion 31 of the head 27. The portion 31 forms, in effect, an extension of pipe portion 25 and delivers the meat therefrom through the elbow or bend 32 thence downwardly to the discharge portion of the head 27. This discharge portion has the downwardly diverging transverse end wall portions 33, 34 and the front and rear wall portions 35, 36 merging with the end walls to define a restricted distributing chamber having an outlet at 37 and an inlet at 38. The horizontal delivery portion of pipe 16 thus extends parallel with the end portions 24, 25 of delivery pipe 23 and parallel with the tubular inlet portion 31, the latter extending at right angles to the downwardly extending outlet 37 of head 27.

Each wall 35, 36 (Fig. 2) is flared downwardly and outwardly from the inlet 38 and then downwardly and inwardly to define the outlet 37 which has an elongated length and a width which is restricted as seen in Fig. 2 relative to the diameter at the inlet 38. I have found that an outlet at 37 when shaped as in Fig. 5 with a transverse restriction at the longitudinal midzone gives very desirable results in restricting the meat entering above the zone 39 from inlet 38 and forcing the meat toward the ends of the outlet opening 37 whereby the meat entering at 38 will leave the head 27 in quantities so proportioned along the length of opening 37 that a mold receptacle or pan 40 will fill uniformly and evenly.

The walls 33 to 36 terminate adjacent outlet 37 in an outwardly extending flange 41 to which is removably secured by fasteners 42 an adapter plate 43 having an opening 44 similar to outlet 37 and forming a continuation thereof. This adapter plate of the head structure 27 is shaped to fit the mold 40 and may be readily substituted by other adapter plates of shape corresponding to other molds so that the same mold filling device may be used for a variety of molds.

In the operation of the device, the meat emulsion is delivered to pipe 16 which may be closed by valve 18. My device may be operated in either of two systems, viz., by the operator holding the mold 40 during the filling operation, or by the operator manipulating the head 27 during the mold filling. I have found that each system has certain advantages although over long continuous time intervals the hand of some operators tends to tire in using the first of the aforesaid systems while others prefer this method.

Assuming valve 18 closed and the system of operation in which the operator manipulates the head 27 during the mold filling, the coupling member 20 and fastener 28 are adjusted to accommodate swivelling of the pipe 23 and the head 27 is swung from a position 27' downwardly into the mold 40 which is supported on a table or the like. The operator then places his right hand on top of the head 27 and with his left hand he gradually opens the valve 18 by turning the handle 19 thereby causing the meat emulsion to be delivered through outlet 37 substantially along the length of the mold 40.

As the mold 40 fills, the head 27 will swing upwardly until it reaches the position indicated at 27" at which time the operator closes valve 18 and slides mold 40 from under the adapter plate 43 which assists in leveling the top of the molded meat. Upward swing of the head 27 will, of course, be accompanied by a slight forward or backward movement of the head as it swivels in coupling 20 and at portion 31 and this correspondingly slides the mold 40 to a slight extent on its support.

In following the alternative system, the coupling 20 and fastener 28 are clamped tightly with head 27 fixed in any convenient position such as the position 27'. Then the operator supports the mold 40 in the palm of his right hand and lifts the mold until the head 27 enters the mold so that relatively the parts 27 and 40 are positioned as shown in Fig. 2. Then the operator gradually opens valve 18 with his left hand as before and as the mold fills, he allows his right hand to be lowered, steadying the mold until it is filled. He then closes valve 18 with his left hand and levels-off the meat by wiping the same on the adapter plate 43 as he withdraws the mold laterally from beneath the head 27.

In following either system the operator soon learns to speedily regulate valve 18 so that the mold is quickly filled and as the meat is delivered under pressure he has only to exert a steadying effort with his right hand to insure uniformity in the density of the molded products. The pressure of delivery from stuffer 10 may, of course, vary and will ordinarily be around 20 to 30 pounds per square inch, for example, depending on the degree of firmness of the emulsion.

The head 27 is so constructed as to insure uniformity in delivering the meat to and throughout the mold 40 without forming holes in the loaf or resulting in a streaky product. Between filling successive molds the meat is prevented from falling out of the opening 37 owing to the restricted pocket formation of the head 27 below inlet 38. In following either of the aforesaid methods of operating my device, the mold 40 and head 27 are moved relatively to one another during the molding operation and more particularly these parts are moved relatively away from each other as the mold fills.

The mold 40 is preferably greased before filling so that the meat loaf, after the customary cooking or baking, may be readily dumped from the mold without danger of spoiling it.

After molding the meat, the molded meat loaf is preferably cooked or baked in the container mold 40 although, if desired, the loaf may be transferred to another receptacle for cooking or baking, or the loaf may be cooked or baked free from any container mold.

I prefer to cook the loaf, when cooking instead of baking is desired, in the container mold 40 fitted with a top (not shown) adapted to exert pressure downwardly on the top of the loaf as illustrated and claimed in my copending application Ser. No. 212,095 filed June 6, 1938.

When baking the molded meat loaf, the resulting baked product is substantially free from objectionable bulges or humps which often form in baking loaves molded by prior methods. My molding device affords an even pressure through the loaf during molding and a relatively low pressure thereby avoiding localized pressure and uneven distribution of the emulsion in the mold which gives rise to bulges when baking.

Various modifications and changes will be apparent from my disclosure and I do not limit my invention in its broader aspects to the particular form and arrangement of parts as illustrated and described.

I claim:

1. In a device for molding meat emulsion in an upwardly open container mold, a hollow head structure having a downwardly directed emulsion dispensing outlet adapted to enter the mold and an inlet end portion extending approximately at right angle to said outlet, a pipe having a delivery portion extending approximately parallel with said head inlet for supplying the emulsion under pressure to the head structure, and means connecting the head structure with said pipe, said connecting means comprising a rigid conduit having substantially parallel end portions, and swivel means coupling the conduit end portions respectively to the pipe delivery portion and to said head inlet, said rigid conduit guiding upward swinging movement of the head structure during dispensing of the meat emulsion in the mold, said swivel means acting to accommodate said upward movement of the hollow head without tilt of said downwardly directed outlet.

2. In a device for molding meat emulsion in a container mold, a hollow head structure adapted to enter the mold and having an emulsion dispensing outlet, a pipe for supplying the emulsion under pressure to the head structure, and an emulsion conducting rigid goose-neck having oppositely directed parallel end portions respectively rotatably connected to the head structure and to said pipe to swingingly guide the head upwardly in the mold during meat dispensing.

3. In a device for molding meat emulsion in a container mold, a hollow head structure adapted to enter the mold and having a downwardly directed emulsion dispensing outlet, said head structure having a laterally directed inlet portion fixed with respect to said outlet, a pipe for supplying the emulsion under pressure to the head structure, a rigid delivery pipe having an outlet end portion adjustably secured to the laterally directed inlet portion of the head structure for delivering the emulsion thereto, said delivery pipe having its other end offset crank-like and parallel with respect to said outlet end portion, and means for adjustably connecting said offset end to said supply pipe for receiving the emulsion therefrom.

4. In a device for molding meat emulsion in a container mold, a rigid hollow head structure adapted to dispense the emulsion into the mold, said head structure having normally relatively immovable inlet and outlet portions, a substantially horizontally disposed relatively stationary pipe for supplying the emulsion under pressure to the head structure, and an emulsion delivery rigid pipe having oppositely directed substantially parallel end portions respectively adapted for connection with said supply pipe and with the inlet portion of said head structure, the end portions of said delivery pipe being relatively offset in a direction transverse to the axis of said supply pipe.

5. In a device for molding meat emulsion in a container mold, a dispensing head structure adapted to enter the mold and having an outlet for dispensing the emulsion into the mold, said head structure having a conduit formed therein for conducting the emulsion downwardly therethrough to said outlet, a substantially horizontally disposed pipe structure for supplying the emulsion under pressure to said head structure, emulsion conducting means rotatably coupled to said supply pipe structure for delivering the emulsion from said supply pipe structure to said head structure, said conducting means swingingly connecting said head structure to said pipe structure to guide movement of said head structure in a predetermined fixed path with respect to said pipe structure and means rotatably coupling said conducting means with said head structure to accommodate movement of said head structure along said path in successive parallel positions upwardly in said mold during normal dispensing of the meat in the mold.

6. In a device for molding meat emulsion in a container mold, a hollow head structure adapted to enter the mold and having an emulsion dispensing outlet, a pipe for supplying the emulsion under pressure to the head structure, and means connecting the head structure with said pipe and adapted to accommodate swinging movement of the head structure in successive parallel positions along a fixed path of movement upwardly in the mold relatively to said pipe during normal dispensing of the meat in the mold.

7. In a device for molding meat emulsion in a container mold, a hollow head structure adapted to enter the mold and having an emulsion dispensing outlet, a substantially horizontal relatively fixed pipe for supplying the emulsion under pressure to the head structure, an emulsion-conducting rigid goose-neck swingingly carrying the head structure therewith at one end thereof, means rotatably coupling the head structure on said goose-neck end and means swivelly connecting the other end of the goose-neck with said pipe to accommodate swinging movement of the head structure upwardly in the mold relatively to said pipe during normal dispensing of the meat in the mold.

8. In a device for molding meat emulsion in a container mold, a hollow head structure adapted to enter the mold and having an emulsion dispensing outlet, a pipe for supplying the emulsion under pressure to the head structure, a rigid swinging delivery pipe having an outlet end portion secured to the head structure for delivering the emulsion thereto, said delivery pipe having its other end parallel to and offset crank-like with respect to said outlet end portion, and means for swivelly connecting said offset end to said supply pipe to accommodate swinging movement of the head structure upwardly in the mold relatively to said pipe during normal dispensing of the meat in the mold.

9. In a device for molding meat emulsion in a container mold, a hollow head structure adapted to enter the mold and having an emulsion dispensing outlet, a relatively fixed pipe for supplying the emulsion under pressure to the head structure, emulsion conducting means supporting the head structure and adapted for connection with said pipe, said conducting means being swingable to move the head along a fixed path, and means connecting said pipe and head structure with said conducting means operable during normal dispensing of the meat in the mold to swivel the head structure with said pipe for upward swinging movement of said head structure in successive parallel positions along said path or to hold the head structure selectively in any one of a plurality of parallel positions along said path and immovable relative to said pipe.

10. In a device for supplying meat to a container mold, a hollow head structure for dispensing the meat into said mold, said head structure having an inlet elbow for receiving a supply of meat under pressure and an outlet adapted to be directed toward said mold, said head structure having a chamber through which the meat is conducted downwardly in passing from said inlet to said outlet, said chamber having an enlarged portion thereof intermediate the top and bottom thereof and having a pair of opposite walls sloping toward each other at the top and bottom of the chamber to merge with said inlet elbow and outlet respectively.

11. In a device for molding meat in a container mold, a hollow head structure adapted to enter the mold and having an inlet for receiving meat under pressure and an outlet for dispensing the meat into the mold, and an adapter plate removably secured to said head structure adjacent said outlet and having a shape substantially corresponding to that of the mold in horizontal cross-section, said plate having a dispensing outlet substantially similar to said head outlet and forming a continuation thereof.

12. In a device for molding meat in a container mold, a hollow head structure adapted to enter the mold and having an inlet for receiving meat under pressure and an outlet for dispensing the meat into the mold, the walls of said head structure bounding said outlet, and an adapter plate underlying said head structure adjacent said outlet and removably secured thereto, said adapter plate having a shape substantially corresponding to that of the mold in horizontal cross-section and having an opening therethrough registered with said outlet.

13. In a device for supplying meat under pressure downwardly into an open top mold, a hollow meat dispensing head structure having an inlet at the top thereof and having opposed end walls diverging outwardly and downwardly from said inlet to provide an elongated distributing chamber for distributing the meat longitudinally in opposite directions downwardly from said inlet, said head structure having an elongated outlet in the bottom thereof for passage of the meat from said distributing chamber into the mold, said head structure having opposed side walls portions of which bound said chamber and diverge upwardly from said outlet to retard direct travel of the meat downwardly from said inlet to said outlet and to force a portion of the meat longitudinally in said chamber for distribution by said end walls toward the end portions of said outlet, said opposed side walls having other portions which diverge downwardly from said inlet to merge with the upwardly diverged side wall portions respectively.

14. In a device for molding meat emulsion in a container mold, a hollow head structure adapted to enter the mold, said head structure having an emulsion inlet end portion and a dispensing outlet directed approximately at right angles to said inlet and normally immovable relatively thereto, a rigid conduit having substantially parallel oppositely directed inlet and delivery end portions, the latter end portion being aligned with the inlet portion of said head structure, and means coupling said conduit delivery end portion with said inlet portion of the head structure for relative rotational adjustment therebetween, said conduit inlet end portion being adapted for rotative support about the axis of this end portion and so arranged in cooperation with said coupling means as to accommodate positioning of said head structure in successive parallel positions.

CONRAD T. LENZKE.